Figure 1:
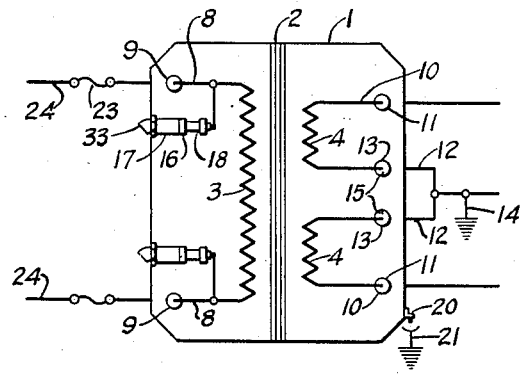

Aug. 6, 1935.   J. K. HODNETTE   2,010,018

EXCESS VOLTAGE PROTECTIVE DEVICE

Original Filed Sept. 9, 1933

WITNESSES:

INVENTOR
John K. Hodnette.
BY
ATTORNEY

Patented Aug. 6, 1935

2,010,018

UNITED STATES PATENT OFFICE 2,010,018

EXCESS-VOLTAGE PROTECTIVE DEVICE

John K. Hodnette, Sharon, Pa., assignor to Westinghouse Electric & Manufacturing Company, East Pittsburgh, Pa., a corporation of Pennsylvania Original application September 9, 1933, Serial No. 688,803. Divided and this application October 18, 1934, Serial No. 748,860

9 Claims. (Cl. 175—30)

This application is a division of my application Serial No. 688,803, filed September 9, 1933, for Surge and outage-proof distribution transformer.

My invention relates to excess-voltage protective devices and it has specific relation to such devices which have been particularly designed for protecting distribution transformers against high-voltage surges.

A distribution transformer receives power from a feeder or primary distribution mains and transforms it to a lower voltage to be supplied to a customer's or consumer's service line or secondary distribution mains. Both the feeder and the customer's service lines are usually of overhead construction and subject to lightning disturbances so that it is necessary to protect the transformer-insulation against failure as a result of lightning disturbances originating on either the feeder or the service line.

My invention is an improvement on a very significant advance in distribution-transformer design which was made, as set forth in my Patent No. 1,923,727, dated August 22, 1933, in which the transformer insulation was protected by coordinated gaps, that is, the break-down voltages of the various gaps were coordinated with the strengths or break-down voltages of the insulations which they were to protect, so that, in the event of an excess-voltage condition, the gaps would break down before the insulation. This patented improvement involved a discharge gap device which carried the excess-voltage charges to ground while at the same time limiting the magnitude of the dynamic follow-arc current to a value which would not blow the primary fuses in the brief period of time necessary for this dynamic follow-current to be finally interrupted in the protective gap-device, usually at the first current-zero. This improvement resulted in protecting the distribution transformers against all excess-voltage surges short of a direct stroke or near-direct stroke, so that an outage would not occur unless there was a dead short-circuit on the customer's service line, or unless there was a direct or near-direct stroke of lightning on the high-voltage feeder, or unless the transformer failed from cumulative overloading.

At the time when my last-mentioned invention was made, it was the general concensus of opinion of engineers in the art, that a direct or near-direct stroke of lightning, characterized by very large surge-currents of 10,000 to 100,000 amperes, was of rather rare occurrence and might be classed as an act of God against which the engineers and operating companies could not be held responsible. Any lightning-stroke on the line, either direct or induced, produces traveling waves, moving along the line in both directions from the scene of disturbance at approximately the speed of light, and calculations have shown that, with typical line-surge-impedances, and insulator flash-over values, the currents accompanying these traveling waves could not exceed about 2,000 amperes on distribution lines. My previously mentioned invention was designed to take care of such traveling-wave surges and to prevent service-interruptions when they entered the transformers.

Field experience with my transformers, with coordinated-gap insulation-protection against traveling-wave surges, has shown, however, that the probability of occurrence of direct or near-direct strokes is much greater than was originally supposed, resulting in failures of the coordinated discharge gaps in about one-half of one percent of all of the distribution transformers which were in serivce in a region of considerable lightning disturbances in about a year's time. In some cases the internally mounted gaps were disrupted with such violence as to blow off the transformer-cover, and occasionally these surge-currents were so heavy as to blow the porcelain-enclosed fuse cut-outs from the pole.

By developing equipment capable of reproducing, in the laboratory, the destructive effects of lightning disturbances which had been experienced in the field, I learned that there were many lightning discharges in excess of 10,000 amperes crest value, and that about a quarter of those disturbances which my original surge-proof transformer had not handled successfully must have had discharge currents of the order of 50,000 amperes crest value, or possibly higher.

My present invention is designed for the purpose of taking care of most, if not all, of these direct and near-direct strokes of lightning, and it has resulted in changes in the entire philosophy of distribution-transformer protection.

My previously mentioned invention provided discharge-gap devices for affording three-point protection for the transformer insulation, that is, for the insulation between the high-voltage winding and the transformer-casing, between the low-voltage winding and the transformer-casing, and between the two windings themselves. The protective gap device consisted of two parts, namely, a resistor and a diffuser, the latter being a quench-gap device in which a discharge-arc was produced between two spaced electrodes in the presence of fibre, sometimes known as hard fibre, which has the property of releasing large quantities of substantially un-ionized gases when subjected to the direct play of an electric arc. The gases are vented through an opening in the transformer casing, so that the arc is blown out. The fibre has the property of remaining non-conducting after such a discharge, that is, although a small quantity of carbon is formed, it is loose and is blown away by the gases, without leaving a conducting streak or path as in the case of some other insulating materials.

Both the diffuser and the resistor were encased in fibre tubes and were disposed as a unitary structure in the upper part of the transformer casing, above the transformer-oil, being connected between the high-voltage leads and the casing. The discharge was carried from the casing to ground through a specially designed discharge gap between the tank and ground. In the case of severe surges, the discharge was also carried over the co-ordinated low voltage bushing and to ground through the customer's neutral ground connection.

The primary function of the resistor is to limit the dynamic current to such a value that it will be interrupted by the diffuser without causing the primary fuse to blow.

My first problem in overcoming the limitations of this diffuser and resistor of my previous invention was to effect improvements in both the diffuser element and the resistor element in order to permit each of them to withstand the heavy discharge-currents of the order of 50,000 amperes and more, which field-experience indicated to be necessary to be handled. The significance of this advancement in the art will be appreciated when it is realized that my original discharge device, in common with other similar devices such as lightning arresters, would handle a surge of only about 10,000 amperes decaying to half value in 15 micro-seconds, whereas my improved device will handle a surge of 50,000 amperes decaying to half value in 100 micro-seconds. The rupturing ability of a discharge device having a surge passing through it depends quite as much on the duration as on the magnitude of the surge. Considering both magnitude and duration, my improved gap will handle a surge 40 times more severe than my original gap.

My improvements in the resistor element resulted in a design in which currents of more than 10,000 amperes could be carried by the resistor without flashing over inside the resistor-tube, and I have also provided additional means whereby extremely large currents would cause an external flash-over outside of the fibre tube within which the resistor was mounted, so as to avoid the blowing up of the resistor tube, as will subsequently be explained more fully in detail. This resulted in an arc in shunt to the resistor, thereby cutting the resistor out of circuit so that it no longer exercised its current-limiting effect.

An object of my invention is, therefore, to provide the improved diffuser and resistor construction just mentioned, either when utilized by itself, or in combination with the distribution transformer and primary fuse cut-out for which it was particularly designed.

Figure 2:
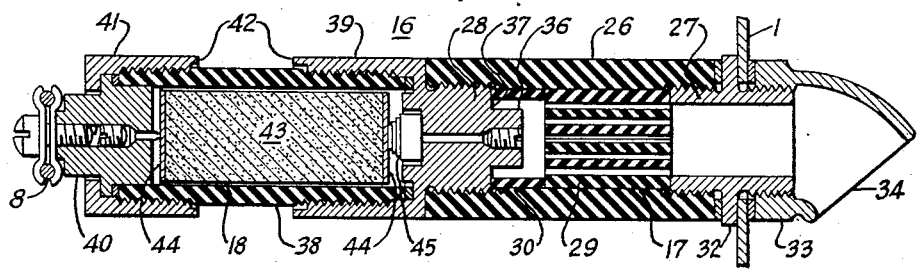

With the foregoing and other objects in view, my invention consists in the apparatus, combinations, methods and systems hereinafter described and claimed, and illustrated in the accompanying drawing wherein:

Figure 1 is a diagrammatic view of circuits and apparatus showing my invention as applied to a distribution transformer, utilizing my improved diffuser and resistor with a protective shunting-gap around the resistor; and Fig. 2 is a cross-sectional view of my improved diffuser and resistor.

My distribution transformer, in common with other distribution transformers, comprises a casing 1, a magnetizable core 2 which is in electrical contact with the casing, and insulated windings comprising a high voltage or primary winding 3 and a low-voltage or secondary winding 4. There are three insulations for the transformer-windings 3 and 4, namely, that between the high-voltage windings 3 and the core 2 or casing 1, that between the low-voltage windings 4 and the core 2 or casing 1, and that between the high-voltage windings 3 and the low-voltage windings 4. The windings 3 and 4 are immersed in oil, which is contained in the transformer-casing 1.

By the term "oil", wherever used throughout the specification and claims, I mean any insulating liquid which is capable of performing the functions of oil in an electric instrumentality.

The high-voltage winding is supplied with energy through high-voltage leads 8 which extend out from the casing through suitable insulating bushings 9. The low-voltage winding supplies energy to the customer's service lines through a plurality of low-voltage leads which may include two secondary phase-leads 10 extending out of the casing through insulating bushings 11, and one or more secondary neutral leads 12 extending out of the casing through insulating bushings 13. The neutral lead, or leads if there are two of them as shown in Fig. 1, are usually joined together outside of the transformer tank and grounded as indicated at 14. In general, the insulation will be of different strengths on some of the windings.

In acordance with the principles of my invention, it is necessary that the flash-over values of the various bushings be coordinated with the impulse strength of the various winding-insulations to protect the insulation, so that any flash-over will occur in the bushing rather than in the insulation. It is also desirable, particularly where the customer grounds his neutral service line, to provide a preferred-path gap device of especially low-voltage disposed between the neutral lead or leads 12 and the casing 1, which may be provided by means of a little set-screw 15 in or attached to the neutral-lead bushings 13, so as to provide a discharge-gap from the casing to the neutral conductor at this point, so as to afford a preferred discharge path from the transformer-casing to the neutral lead 12, rather than to the low-voltage phase-leads 10.

In accordance with my invention, three-point protection is provided, both for the windings 3 and 4 and for the bushings 9, 11 and 13. This protection may be afforded by any means which are connected in shunt relation to the various winding-insulations and bushings, and coordinated therewith so as to break down before the protected insulation breaks down. In general, the three-point protective device includes, among other elements, an arc-quenching discharge-gap device 16 mounted inside of the transformer casing and connected between each high-voltage lead 8 and the casing, said discharge-gap device, in general, including a diffuser element 17 in which the arc is quenched and a serially connected resistor element 18.

The tank is preferably insulated from the ground, so that when a discharge occurs through the discharge device 16 the tank assumes some intermediate potential and breaks down a separate discharge-gap device 20 which is provided between the casing 1 and ground, said discharge-gap device being either an ordinary gap-device or a device of improved construction such as is described and claimed in my application entitled "Lightning-arrester discharge-gap devices", Serial No. 688,802, filed September 9, 1933. When the discharge-gap device 20 is utilized, that is, when the casing 1 is not solidly grounded, the discharge-gap device 20 is so coordinated with the neutral discharge-gap device 15 that the discharge-gap device 20 breaks down first, normally carrying the discharge from the casing to ground. The ground connection 21 of the discharge-gap device 20 may be either the same as, or separate from, the customer's ground connection 14.

The distribution-transformer installation, in the embodiment of my invention shown in Fig. 1, is completed by a renewable external fuse cut-out 23 which is connected in series with the high-voltage leads 8 externally of the transformer-casing, and which serves as the connecting link between the distribution transformer and the high-voltage feeder or primary distribution network 24.

The combined diffuser and resistor 17 and 18, constituting the protective discharge device 16, is shown in detail in Fig. 2. The diffuser 17 comprises an enclosing tubular fibre insulating member 26 defining a diffuser chamber, terminal electrodes 27 and 28 at the respective ends of the diffuser chamber, a multi-slotted fibre diffuser element or plug 29 within said enclosing tubular fibre member 26 and having one end abutting against the terminal electrode 27, the other end being spaced from the other terminal electrode 28 by means of a separate fibre spacer-tube 30. The first-mentioned terminal electrode 27 is hollow and is provided with a centrally disposed external shoulder 32 which abuts against the inside of the transformer casing 1, the casing being bored at this point so that the end portion of the terminal member 27 extends through the casing, being held in place by means of a nut 33 which may also be provided with a downwardly sloping faucet-like discharge portion 34. The other terminal electrode 28 preferably constitutes a closed end for the diffuser chamber and is preferably provided with an axially disposed, inwardly directed protuberance 36 of reduced diameter, thus providing a shoulder 37 back of the protuberance, the insulating spacer-tube 30 abutting against this shoulder. The fibre element has the property, as previously noted, of evolving large quantities of substantially non-ionized gases under the influence of the direct play of an arc, so that when the discharge gap between the two terminal electrodes breaks down, the resulting arc is quickly blown out.

The resistor element 18 comprises a tubular insulating sleeve 38, preferably of fibre, with metal electrodes in the end thereof. One of the metal electrodes is integral with the terminal electrode 28 of the diffuser elements, and comprises a portion 39 which is external of the resistor-enclosing sleeve 38. The other metallic electrode of the resistor element is shown as being made in two parts, namely, a plug 40 and a cap 41 which includes a portion external of the sleeve 38. The two external portions 39 and 41 constitutes an external gap-device 42 which breaks down at a terminal voltage lower than the voltage at which an internal flash-over occurs inside of the insulating tube 38.

The resistance-device 18 comprises a resistor unit 43 in the form of a resistance element or rod which is prepared in rod formation from a ceramic mixture, under high pressure and high temperature. The resistance of the element 43 depends somewhat upon the primary voltage of the transformer and is such as to limit the power-follow current to a reasonable value, usually under 500 amperes, it being understood that the impedance of the external connections must be added to the resistance of the resistor element 43 in order to determine the total impedance of the discharge circuit. Five or six ohms is a suitable value for the resistor element 43 for a 2400-volt transformer. The resistor rod 43 has a negative resistance characteristic so that its resistance when carrying very heavy currents is somewhat smaller. The two ends of the resistor rod 43 are copper-coated as indicated at 44. One end of the resistor rod abuts directly against one of the terminal electrodes 40 and the other is held firmly in place by means of a spring connection 45.

The resistor-enclosing insulating sleeve 38 has a filling of an insulating flowable material such as gum, having high dielectric strength and heavy viscosity, surrounding said resistor unit 43 and completely filling said sleeve.

As previously mentioned, it is necessary for both the diffuser element 17 and the resistor element 18 to be able to withstand discharge-current surges of much more than 2,000 amperes crest value. At the time of the development of my combined resistor and diffuser of my above-mentioned patent, the maximum surge-current that could be developed in the laboratory, for test purposes, was of the order of 10,000 amperes. It was necessary therefore, to develop laboratory facilities for producing much larger surge currents. The original resistor element was not provided with the gum filling and was not provided with the external gap device 42. Careful tests indicated that it would flash-over internally, that is, inside its enclosing insulating sleeve, when carrying a surge-current of approximately 6,000 amperes with a duration of 15 micro-seconds to half value. With currents as high as 10,000 amperes, the internal stress within the insulating tube was sufficient to actually disrupt the insulating tube, and when the surge-currents were increased to something of the order of 50,000 amperes and a duration of 100 micro-seconds, the resistor casing was blown up with sufficient force to blow the cover from the transformer, thus simulating conditions which were obtained in a few instances in actual service.

From these tests it was learned that the flash-over took place along the surface of the resistance rod, and apparently no simple change which could be affected would materially increase the current-carrying ability without flash-over. Consequently, tests were undertaken to determine what could be accomplished with fillings of various insulators such as vaseline, oil and various waxes. Repeated tests showed that a much higher initial internal break-down voltage could be obtained by this method. I reached the conclusion that it would be desirable to utilize a filling material which had a relatively heavy viscosity, so that it would not materially impregnate the resistor rod.

By the foregoing means I have been able to improve the internal flash-over point of the resistance rod from 6,000 amperes as mentioned above, to approximately 25,000 amperes, the duration to half value being about 15 micro-seconds.

The construction of the resistor-element housing was then modified to provide the electrode portions 39, 41, or their equivalent, at each end of the resistance element, so as to provide the external gap 42 which would make the resistor element have a lower flash-over potential on the outside than on the inside. With this arrangement the flash-over on the outside would occur with a surge-current of approximately 12,000 amperes, or about one-half of the surge-current required to produce internal flash-over, thus providing a factor of safety of approximately 2 to 1 against the possibility of internal flash-over.

The external flash-over path of the resistance element is desirable because, when the flash-over occurs inside the insulating tubular casing of the resistor element, the restricted place between the resistor rod and the wall of the tube results in a high arc voltage and consequently greater energy-dissipation for a given surge-current. This energy-dissipation has been found, as above noted, to be sufficient not only to blow up the casing of the resistance rod, but actually, in some instances, to blow the cover off the transformer. When the flash-over takes place outside of the resistance-enclosing tube 38, the arc is unrestricted so that the arc voltage is therefore very low, with the result that only a small amount of energy is dissipated, and the danger of the cover being blown off from the transformer is minimized.

One might consider that the external flash-over of the resistor element, under high curent-discharge conditions would be undesirable, particularly since the element is mounted in the transformer in the space above the oil. Experience both in the field and in the laboratory indicates, however, that there is no hazard connected with this arrangement. Oil vapors from the transformer oil are not explosive. They can be made to burn when raised to a sufficiently high temperature, but they cannot be exploded as the result of a spark. The only condition under which an explosive mixture has been known to occur in a transformer has come about from a failure of the winding under the oil, resulting in a stewing arc which "cracks" or breaks down the oil, giving off both hydrogen and acetylene gas. These gases mixed with air, are explosive over a wide range of relative proportions of the mixture.

In a transformer protected with my three-point method of protection, the chances of a winding-failure are eliminated, since the voltage permitted on the winding by the protective devices are only of the order of 50% of the insulation-strength of the winding. Hence there is no possibility of a stewing arc under the oil, which would produce an explosive mixture.

I have conducted experiments in the laboratory in which the oil of the transformer has been heated to the point where the space above it was filled with oil vapor. Arcs discharged in this space under this condition would not produce an internal explosion. The reason for this is that the oil-vapor coming in contact with the arc would be practically broken down and oxidized, at the same time preventing an accumulation of hydrogen or acetylene in the air-space above the oil.

Repeated tests in the laboratory, on transformers equipped with these improved gaps, have been made. Surges as high as 50,000 amperes have been applied, flashing externally over the resistance rod and discharging through the diffuser without producing noticeable carbonization or even the slightest internal damage to the transformer. Burning at the electrodes is so slight as to be entirely un-noticeable except on the closest examination, due to the extreme rapidity with which the diffuser limits and quenches the dynamic follow-current.

In order to obtain sufficient current-carrying capacity in the discharge device as a whole, I found it necessary or desirable to make certain changes also in the diffuser element, although this element, as originally constructed, came nearer to meeting my requirements than the original resistor element shown in my aforementioned patent. I found it desirable to modify the solid electrode 28 by providing the protuberance 36 of reduced diameter, as above described, so as to direct the flash-over through the slots in the diffuser 29, in an effort to prevent the arc from passing through the outer space between the diffuser and the inside inner walls of the enclosing fibre tube 26. It was found that when the discharge was permitted to pass in this outer space, the enclosing tubular member 26 would occasionally be ruptured. To the same end, I found it desirable to utilize the separate fibre spaced-tube 30 which fitted closely against the inner walls of the outer enclosing tube 26 and which extended far enough back of the arcing surface of the protuberance so that the arc would always be inside of the spacer-tube 30 rather than outside.

It is desirable to utilize a separate spacer-tube 30, rather than an integral-shoulder outer-tube construction because such an integral fibre tube-construction would necessitate a machining operation inside the tube in order to produce the shoulder which is now formed by the spacer-tube 30, and this machining operation would not only be costly and wasteful of material, but it would also result in a much weaker mechanical construction, because experience teaches that the fibre tube owes most of its mechanical strength to the material lying closest to the inner walls thereof, so that the removal of this material by the machining operation would weaken the tube disproportionately.

The spacer-tube 30 provides a space between the end of the slotted diffuser element 29 and the terminal electrode 28, so that the ionization produced by an arc-discharge in any one of the slots of the diffuser element 29 can enter this space and thus initiate an arc discharge in the other slots of the diffuser element, so that the total discharge will not be limited to a single slot, as pointed out more fully in a patent to W. G. Roman, 1,923,748, patented August 22, 1933.

The operation of my protected distribution transformer as shown in Fig. 1 is as follows:

In the case of a small surge-current, illustrating a condition resulting from a traveling wave entering the transformer from the feeder 24, it may be assumed that a surge-current of 2000 amperes enters one or both of the high-voltage leads 8 of the transformer and penetrates the high-voltage winding 3 until the voltage on the high-voltage lead or leads reaches the flash-over value of the protective gap-device or diffuser 16. The surge-current, passing through the resistor-element 18, will be of sufficiently small magnitude so that neither an internal nor external flash-over of the resistor element will take place. The discharge of the protective gap-device 16 places a charge on the tank or casing 1 of the transformer, thus raising its potential and immediately causing a flash-over of the discharge gap 20 which thus discharges the surge to ground.

In most cases, the discharge of the high-voltage protective gap device 16 will take place at such portion of the voltage-wave that a power arc will follow the discharge. The lightning surge-discharge occurs in a few micro-seconds, of the order of from 5 to 50. The power current which follows the surge is limited in magnitude by the resistance of the resistance rod 43 of the resistance element 18 and by the impedance of the external circuit, and it is quenched by the operation of the diffuser at the first current-zero. The operation under these conditions is identical with that of the original protective gap-device of my Patent No. 1,923,727.

In the case of a very heavy surge-current, illustrating a condition resulting from a direct or near-direct lightning stroke to the high-voltage line close to the transformer, when a surge of this type enters the high-voltage lead of the transformer, it results in a discharge across the protective gap-device 16 as before mentioned. However, as the surge current builds up in the resistance rod 43 of the resistance device 18, the IR drop across the resistance rod increases to the point where a flash-over will occur on the outside of the resistor-enclosing tube 38, across the gap 42 between the external portions 39, 41 of the terminal electrodes which are in contact with the ends of the resistance rod. After this takes place, the path of the discharge is then through the arc on the outside of the protective gap device 16, to the center terminal-electrode 28, and then through the diffuser.

Under this condition it might be expected that a very heavy dynamic current would flow until the first current-zero is reached, because the resistor element has been shunted out of the circuit; but I have found that this is not the case. When the diffuser-gap is discharging high surge-currents, large quantities of un-ionized gas are present in the diffuser element. This produces a very high pressure, which increases the arc-voltage in the diffuser to such an extent that the dynamic power current is almost immediately quenched. Oscillograms show that the dynamic follow-current under these conditions is extinguished in a small fraction of a cycle.

In case a surge should originate on the low-voltage service lines which are connected to the secondary side of the transformer, a part of the surge will, of course, flow into the customer's ground, while the other part will approach the transformer, flash-over the coordinated low-voltage bushings 11 to the tank, and be discharged to ground through the discharge gap 20. The high-voltage primary winding will not be involved, unless, as often happens, a surge of the same magnitude is induced in the high-voltage leads at the same time by the same lightning stroke. The low voltage of the service line, on the secondary side, will be insufficient to sustain a power follow-current.

It is clear that, with the voltage limited between the high-voltage winding and the core or casing, by means of the coordinated diffuser or protective-gap device 16, and with the voltage limited between the low-voltage winding and the core or casing by means of the coordinated bushing-discharge devices 11 and 13 and the coordinated tank-discharge device 20, the maximum voltage between the two windings themselves will also be limited by the two coordinated protective discharge devices in series. Thus definite and positive protection is provided for each of the three insulations, and hence the name, three-point protection.

When I refer to protective discharge-gap devices I mean to include any device which performs the function of a self-quenching arc gap, that is, any device which has the property of quickly changing from substantially an insulator to a reasonably good conductor upon the occurrence of an excess-voltage surge, and quickly returning to the condition of being substantially an insulator upon the restoration of normal voltage conditions.

While I have illustrated my invention in a preferred embodiment, it will be evident that many modifications and changes may be made by those skilled in the art without departing from the essential principles and purposes of my invention. I desire, therefore, that the appended claims shall be accorded the broadest interpretation consistent with their language and the prior art.

I claim as my invention:

1. An arc-extinguishing gap device for use on an alternating-current supply-line for affording protection against excess-voltage surges, comprising a two-part flash-over protective device including an arc-extinguishing gap device and a serially connected resistance device, the resistance device comprising a tubular insulating sleeve, metallic electrodes in the ends of said sleeve, and a resistor unit between said electrodes within said sleeve, said electrodes including portions external of said sleeve which are so close together as to flash over, on rising potentials, before the resistor unit flashes over inside of said sleeve.

2. An arc-extinguishing gap device for use on an alternating-current supply-line for affording protection against excess-voltage surges, comprising a two-part flash-over protective device including an arc-extinguishing gap device and a serially connected resistance device, the resistance device comprising a tubular insulating sleeve, metallic electrodes in the ends of said sleeve, a resistor unit between said electrodes within said sleeve, and a filling of an insulating flowable material of high dielectric strength and heavy viscosity surrounding said resistor unit and filling said sleeve, said electrodes including portions external of said sleeve which are so close together as to flash over, on rising potentials, before the resistor unit flashes over inside of said sleeve.

3. A resistance device comprising a tubular insulating sleeve, metallic electrodes in the ends of said sleeve, and a resistor unit between said electrodes within said sleeve, said electrodes including portions external of said sleeve which are so close together as to flash over, on rising potentials, before the resistor unit flashes over inside of said sleeve.

4. A resistance device comprising a tubular insulating sleeve, metallic electrodes in the ends of said sleeve, a resistor unit between said electrodes within said sleeve, and a filling of an insulating flowable material of high dielectric strength and heavy viscosity surrounding said resistor unit and filling said sleeve, said electrodes including portions external of said sleeve which are so close together as to flash over, on rising potentials, before the resistor unit flashes over inside of said sleeve.

5. An arc-extinguishing gap device for use on an alternating-current supply-line for affording protection against excess-voltage surges, comprising a diffuser having an enclosing tubular insulating member defining a diffuser chamber, terminal electrodes at the respective ends of said diffuser chamber, at least one of said terminal electrodes being provided with means for venting the diffuser chamber, at least one of said terminal electrodes having an axially disposed, inwardly directed protuberance of reduced diameter, with a shoulder back of the protuberance, a multi-slotted diffuser element of insulating gas-evolving arc-responsive material fitting within said enclosing tubular insulating member, and a separate insulating spacer-tube fitting within said enclosing tubular insulating member and disposed between said diffuser element and said shoulder.

6. An arc-extinguishing gap device for use on an alternating-current supply-line for affording protection against excess-voltage surges, comprising a diffuser having an enclosing tubular fibre insulating member defining a diffuser chamber, terminal electrodes at the respective ends of said diffuser chamber, a multi-slotted fibre diffuser element fitting within said enclosing tubular insulating member, and a separate fibre spacer-tube fitting within said enclosing tubular insulating member, and disposed between said diffuser element and one of the terminal electrodes, at least one of the terminal electrodes being provided with means for venting the diffuser chamber.

7. An arc-extinguishing gap device for use on an alternating-current supply-line for affording protection against excess-voltage surges, comprising a two-part flashover protective device including an arc-extinguishing gap device and a serially connected resistance device, the arc-extinguishing gap device comprising a diffuser having an enclosing tubular insulating member defining a diffuser chamber, terminal electrodes at the respective ends of said diffuser chamber, means for venting said diffuser chamber, and arc-responsive gas-evolving means in said diffuser chamber, the resistance device comprising a tubular insulating sleeve, metallic electrodes in the ends of said sleeve, and a resistor unit between said metallic electrodes within said sleeve, said metallic electrodes including portions external of said sleeve which are so close together as to flash over, on rising potentials, before the resistor unit flashes over inside of said sleeve.

8. An arc-extinguishing gap device for use on an alternating-current supply-line for affording protection against excess-voltage surges, comprising a two-part flashover protective device including an arc-extinguishing gap device and a serially connected resistance device, the resistance device having a mounting characterized by a flash-over gap which does not break down until the current carried by the resistance device exceeds about 6,000 amperes.

9. An arc-extinguishing gap device for use on an alternating-current supply-line for affording protection against excess-voltage surges, comprising a two-part flash-over protective device including an arc-extinguishing gap device and a serially connected resistance device, the resistance device having a mounting characterized by a flash-over gap which does not break down until the current carried by the resistance device exceeds the maximum traveling-wave discharge-current of said supply-line, the arc-extinguishing gap device being capable, in general, of extinguishing the power-arc following a travelling-wave discharge at the first current-zero, and also capable, in general, of extinguishing the power-arc following a flash-over of said resistance gap within a small fraction of a cycle.

JOHN K. HODNETTE.